United States Patent [19]
Krumbein

[11] 3,860,196
[45] Jan. 14, 1975

[54] APPARATUS FOR INTERCEPTING AND ADVANCING THE LEADER OF CONVOLUTED STRIP MATERIAL

[75] Inventor: Fritz Krumbein, Stuttgart-Mohringen, Germany

[73] Assignee: Robert Bosch Photokino GmbH, Stuttgart, Germany

[22] Filed: Oct. 17, 1972

[21] Appl. No.: 300,416

[30] Foreign Application Priority Data
Oct. 23, 1971  Germany............................ 2152896

[52] U.S. Cl................. 242/195, 242/205, 242/210, 352/158
[51] Int. Cl............................ G03b 1/58, G03b 1/04
[58] Field of Search ........... 242/195, 210, 208, 205; 352/157, 158

[56] References Cited
UNITED STATES PATENTS
3,337,146 8/1967 Miyauchi et al.................... 242/208
3,724,777 4/1973 Martin............................... 242/195

*Primary Examiner*—George F. Mautz
*Attorney, Agent, or Firm*—Michael S. Striker

[57] ABSTRACT

The leader of convoluted motion picture film which is stored on a supply reel in a motion picture camera or projector is automatically intercepted and advanced in a direction toward a takeup reel by a composite intercepting device having a hook which can enter a perforation of the leader while the supply reel rotates in a direction to collect the film. The intercepting device can be moved from an inoperative position by way of a manually operated actuating device which causes a driving wheel to engage a convex surface of the intercepting device whereby the hook of the intercepting device automatically moves toward a catching position in which it bears against the outermost convolution of the film and enters the oncoming perforation. The rotating supply reel causes the intercepted leader to disengage the convex surface from the driving wheel and to move a concave surface of the intercepting device into engagement with the driving wheel whereby the intercepting device, with the leader attached to its hook, automatically returns to its inoperative position. The hook inserts the leader into the nip of two advancing rolls which disengage the leader from the hook and advance the leader toward a takeup reel. The motor for the driving wheel is started in response to movement of the intercepting device from inoperative position and is automatically arrested when the intercepting device reassumes its inoperative position or when the user returns the actuating device to an idle position.

14 Claims, 2 Drawing Figures

APPARATUS FOR INTERCEPTING AND ADVANCING THE LEADER OF CONVOLUTED STRIP MATERIAL

BACKGROUND OF THE INVENTION

The present invention relates to cinematographic or like apparatus in general, and more particularly to improvements in apparatus for catching or intercepting and advancing the leader of a supply of convoluted motion picture film or other flexible strip-shaped material. Still more particularly, the invention relates to apparatus which can be used with advantage in motion picture cameras or in motion picture projects (with or without recording or reproduction of sound) to automatically catch or intercept the leader of convoluted motion picture film and to advance the thus intercepted leader along a predetermined path, for example, toward the core of a takeup reel.

It is already known to provide a cinematographic apparatus with means for intercepting the leader of convoluted film for the purpose of transporting the intercepted leader toward the takeup reel so that the leader is caused to advance behind the picture taking lens of a motion picture camera or behind the lens system of a motion picture projector. A drawback of presently known methods and apparatus is that they are in part too complex or that they require the user to perform an excessive number of manual operations. Furthermore, the presently known film intercepting apparatus are not sufficiently reliable and occupy too much room in the housing of a cinematographic apparatus. Still further, the supervision of intercepting and threading operations cannot be entrusted to a relatively inexperienced person because the operation of the apparatus is not foolproof.

SUMMARY OF THE INVENTION

An object of the invention is to provide a novel and improved apparatus for intercepting or catching the leader of a supply of convoluted flexible strip-shaped material, such as magnetic tape or motion picture film.

Another object of the invention is to provide a novel and improved apparatus of intercepting the leader of a rotating supply of convoluted strip-shaped material and for automatically transporting the intercepted leader along a path wherein the leader is guided to advance in a direction toward a takeup reel or the like.

A further object of the invention is to provide a relatively simple, compact, inexpensive and rugged apparatus which is capable of automatically intercepting and advancing the leader of a supply of convoluted strip-shaped material so that the person in charge need not touch the strip-shaped material at any time in the course of the intercepting and advancing operations.

An additional object of the invention is to provide a novel and improved threading apparatus which can be used in motion picture cameras or projectors with or without recording and reproduction of sound, in sound recording and reproducing apparatus or in analogous machines wherein the leader of a supply of convoluted strip-shaped material must be automatically located, caught and advanced or threaded along a predetermined path.

A further object of the invention is to provide the apparatus with a novel and improved intercepting device and with novel and improved means for controlling the movements of the intercepting device during travel toward and from a supply of convoluted strip-shaped material.

Still another object of the invention is to provide a strip-intercepting and advancing mechanism whose energy requirements are low, which can be installed in presently known types of cinematographic apparatus or the like without necessitating substantial alterations in the design of such apparatus, and which can be manipulated by experienced persons as well as by novices without risking damage to the strip-shaped material, to the mechanism and/or to the apparatus.

The apparatus of the present invention may be utilized for intercepting the leader of a supply of convoluted strip-shaped material wherein the leader constitutes the free end portion of the outermost convolution of the supply. The apparatus comprises driving means and an intercepting device having first and second motion receiving means and being movable seriatim from a first position in which the driving means is disengaged from the two motion receiving means to a second position in which the driving means engages the first motion receiving means to automatically move the intercepting device to a leader-intercepting third position, and a fourth position in which the driving means engages the second motion receiving means to automatically return the intercepting device to the first position. The apparatus further comprising actuating means which is operable to move the intercepting device from the first to the second position whereby the intercepting device automatically advances to the third position to intercept the leader, and means for moving the intercepting device from the third to the fourth position with the intercepted leader whereby the intercepting device automatically returns to its first position.

The intercepting device further comprises a holder, a catcher arm which is provided on the holder, and a material-engaging portion which is provided on the catcher arm. The apparatus further comprises supporting means for the holder; the holder is turnable relative to the supporting means about a predetermined axis and the supporting means is movable in a plane which is disposed substantially at right angles to such axis.

The novel features which are considered as characteristic of the invention are set fourth in particular in the appended claims. The improved strip intercepting and advancing apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
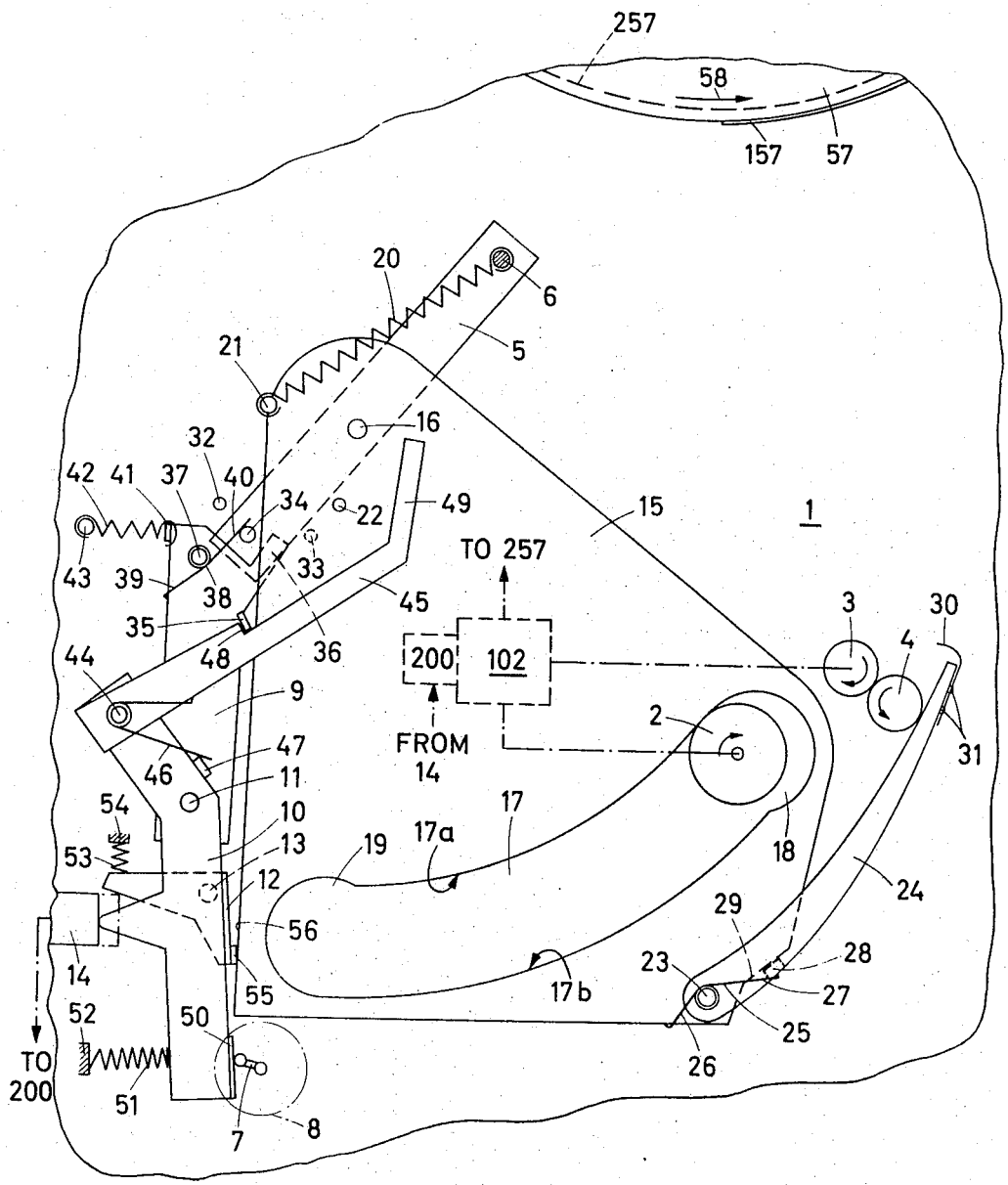
FIG. 1 is an elevational view of an improved strip intercepting and advancing apparatus which is installed in the housing of a motion picture projector and wherein the strip intercepting device is about to move toward the intercepting position.

Referring first to FIG. 1, there is shown the housing 1 of a motion picture projector. The housing 1 contains a driving member here shown as a wheel 2 which receives torque from a prime mover here shown as an electric motor 102, a pair of advancing rolls 3, 4 which can transport the motion picture film 157 toward a takeup reel (not shown), a supporting lever 5 which is turnable on a stationary pivot member 6, an actuating device 7 which can be rotated by a knob 8, a second lever 9 which is mounted on a stationary pivot member 11, an intermediate lever 10 which is also mounted on the pivot member 11, a blocking lever 12 which is turnable on a pivot pin 13, and a reciprocable switch closing and opening slide 14 which constitutes the input member of the means for starting and arresting the motor 102.

The supporting lever 5 carries the pivot member 16 for a segment-shaped support or holder 15 which forms part of a film catching or intercepting device and is provided with an arcuate cutout or window 17 for the driving wheel 2. The cutout 17 is formed with enlarged end portions 18, 19 of generally circular outline each of which can receive the wheel 2 with a certain amount of clearance. The holder 15 is biased by a resilient element here shown as a helical spring 20 one end of which is attached to the stationary pivot member 6 for the supporting lever 5 and the other end of which is coupled to a post 21 on the holder 15. A projection 22 on the holder 15 is adjacent to but spaced from the pivot member 16. Still further, the holder 15 is provided with a pivot pin 23 for a catcher arm 24 which is a one-armed lever and is biased counterclockwise, as viewed in FIG. 1, by a torsion spring 25 having a first leg 26 engaging the lower edge face of the holder 15 and a second leg 27 which bears against a projection 28 on the catcher arm 24 to thereby urge the projection 28 against the adjacent edge face or abutment 29 of the holder 15. The free end of the catcher arm 24 is provided with a hook-shaped film engaging portion 30 which is secured to the catcher arm 24 by rivets 31 or analogous fasteners. The parts 15, 24 and 30 together constitute the aforementioned film intercepting device.

The extent of pivotal movement of the supporting lever 5 relative to the housing 1 is limited by two fixed stops 32 and 33. This supporting lever 5 further carries a motion transmitting pin 34 which is engaged by the leg 40 of a torsion spring 38. The lever 9 is formed with two projections or lugs 35 and 36 and carries a projection or pin 37 for the coiled central portion of the torsion spring 38. The leg 39 of the spring 38 engages the left-hand edge face of the lever 9, and the leg 40 tends to move the motion transmitting pin 34 of the supporting lever 5 against the lug 36. A further projection or post 41 of the lever 9 is attached to one end of a helical spring 42 which is secured to a stationary post 43. The spring 42 furnishes a first directional force by tending to pivot the lever 9 in a counterclockwise direction, as viewed in FIG. 1, to thereby engage the holder 15 with the driving wheel 2. The spring 38 furnishes a second directional force which tends to disengage the holder 15 from the driving wheel 2.

The intermediate lever 10 is provided with a shaft 44 for an entraining lever 45 having at its free end an inclined portion 49 which can be moved into abutment with the projection 22 of the holder 15. The entraining lever 45 is biased by a torsion spring 46 which is convoluted around the shaft 44 and tends to turn the lever 45 in a counterclockwise direction. One leg of the torsion spring 46 bears against a projection or lug 47 of the intermediate lever 10. The purpose of the torsion spring 46 is to urge the entraining lever 45 against the projection 35 of the lever 9. As shown, the entraining lever 45 is formed with a shoulder 48 which can abut against the projection 35.

The intermediate lever 10 is further provided with a bent-over portion or bracket 50 which can be engaged by the actuating member 7 in response to rotation of the knob 8 to thereby pivot the intermediate lever 10 in a clockwise direction, as viewed in FIG. 1. The lever 10 is biased counterclockwise by a helical spring 51 which reacts against a stationary retainer 52 in the housing 1. The blocking lever 12 is biased by a helical spring 53 which reacts against a stationary retainer 54 and tends to maintain a projection or lug 55 of the blocking lever 12 in engagement with the adjacent edge face 56 of the holder 15. When the spring 53 is free to expand, it maintains the blocking lever 12 in the path of movement of the input member or slide 14 so that the latter cannot move to the phantom-like position of FIG. 1.

The purpose of the just described structure is to intercept the leader of motion picture film 157 and to move the intercepted leader away from the outermost convolution of a supply 57 of convoluted film which is stored on a supply reel not shown. The leader thereupon moved into the range of advancing rolls 3, 4 which transport the film 157 toward the takeup reel. The arrow 58 indicates the direction in which the supply reel, with convoluted film 57 thereon, must be rotated in order to collect the film. The leader of the film 157 is provided with a perforation 157a (FIG. 2) or with a row of perforations serving to receive a portion of the hook 30 on the catcher arm 24. As will be described below, the hook 30 can be moved against the outer side of the outermost convolution of film supply 57 to enter one of the perforations 157a prior to moving the leader of film 157 toward the advancing rolls 3, 4 at least one of which is driven by the motor 102 through a suitable transmission, not shown.

The line connecting the axis of the pivot member 6 with the axis of the pivot member 16 is at least substantially normal to the line connecting the axis of the pivot member 16 with the axis of the driving wheel 2.

The spring 20 furnishes a third directional force tending to move the intercepting device 15, 24, 30 to its first position.

The Operation

Prior to starting a film intercepting and advancing operation, the holder 15 for the catcher arm 24 is held in a first position close to a second position shown in FIG. 1. The first position is the waiting or idle position of the holder 15. The slide 14 then dwells in the phantom-line first position of FIG. 1 which indicates that the starter switch 200 for the motor 102 (which drives the wheel 2 and at least one of the advancing rolls 3, 4) is open. The directions in which the motor 102 can rotate the parts 2, 3 and 4 are indicated by arrows. In the aforementioned first position of the holder 15, the driving wheel 2 is received with clearance in the enlarged end portion 18 of the arcuate cutout 17 so that it does not engage the holder 15.

The user thereupon operates the actuating member 7 by way of the knob 8 so that the blocking lever 12 turns on the pivot member 11 in a clockwise direction against the opposition of the spring 51. The actuating member 7 directly engages the bracket 50 of the lever 10 whereby the latter moves the input member or slide 14 to the operative or second position which is shown in FIG. 1 by solid lines so that the slide 14 closes the switch 200 to start the motor 102 for the driving wheel 2 and at least one of the advancing rolls 3, 4. At the same time, the lever 10 displaces the entraining lever 45 whose shoulder 48 moves the projection 35 so that the lever 9 turns clockwise to the position shown in FIG. 1 and moves its projection 36 away from the pin 34 on the supporting lever 5. Consequently, the leg 40 of the torsion spring 38 is free to turn the supporting lever 5 by way of the pin 34 in a counterclockwise direction, as viewed in FIG. 1, whereby the supporting lever 5 displaces the holder 15 so that the convex first motion receiving surface 17a bounding the upper side of the cutout 17 moves into motion-receiving engagement with the rotating driving wheel 2. Such second position of the holder 15 is shown in FIG. 1. Thus, the holder 15 and the catcher arm 24 have completed the first stage of their movement toward a third or film-intercepting position. The driving wheel 2 rotates in a clockwise direction and causes the holder 15 to turn on the pivot member 16 in a counterclockwise direction whereby the holder 15 stresses the spring 20. During the initial stage of such movement of the holder 15 toward the third position, the edge face 56 moves away from the adjacent lug 55 on the blocking lever 12 so that the latter is free to turn under the action of the spring 53 and to enter the path of movement of the slide 14 which then remains in the solid-line position and prevents an opening of the switch 200 for the motor 102.

As the holder 15 continues to turn in a counterclockwise direction, the resistance which the spring 20 offers to such movement decreases because the line connecting the axis of the post 21 with the axis of the pivot member 6 moves closer to the pivot member 16, i.e., the spring 20 approaches its dead-center position.

Figure 2:
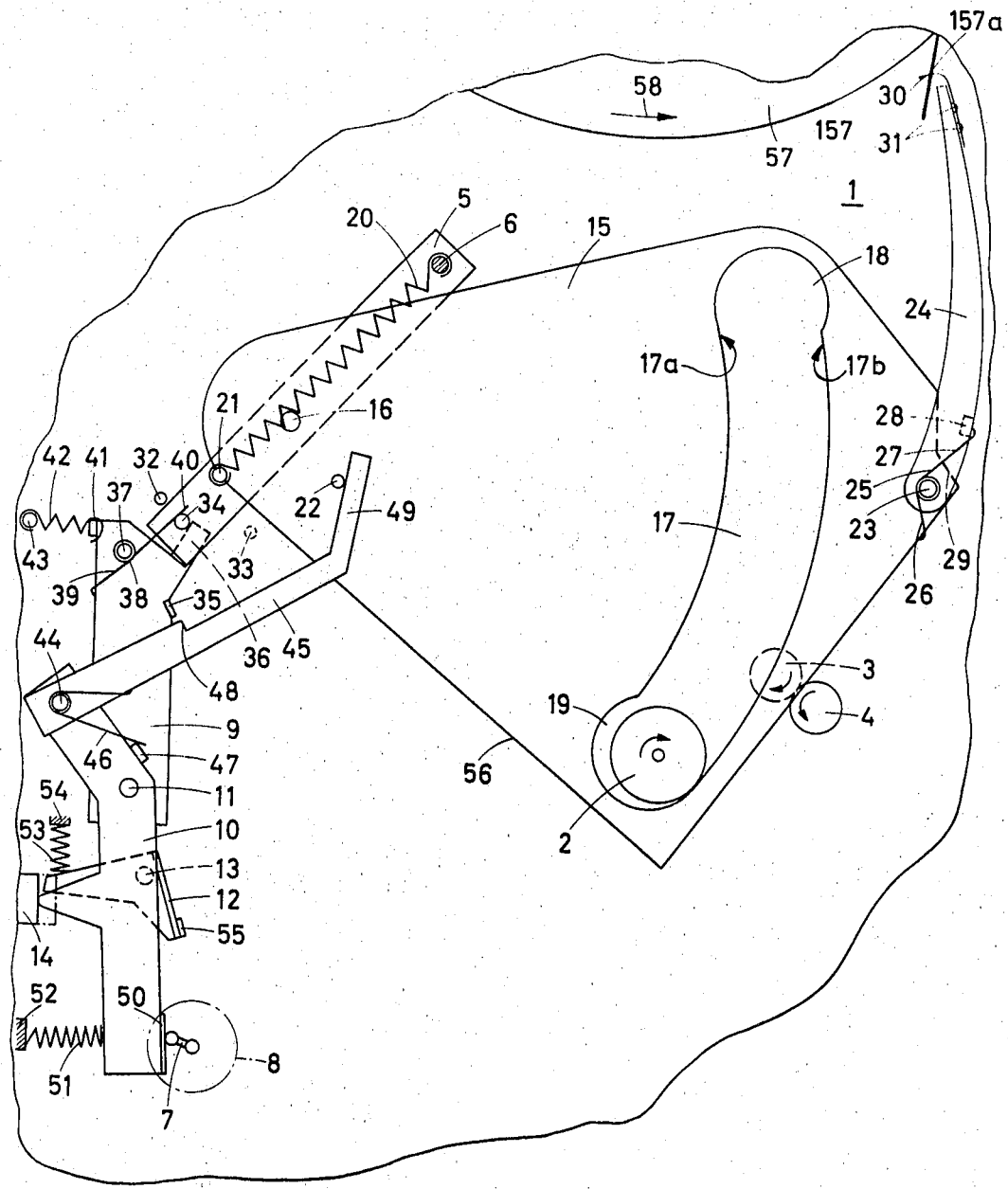
FIG. 2 is a similar elevational view but showing the intercepting device at the start of its return movement to idle position.

When the catcher arm 24 reaches the third position which is close to the fourth position shown in FIG. 2, the driving wheel 2 enters and is positioned with some clearance in the enlarged portion 19 of the cutout 17 so that the holder 15 comes to a halt because the peripheral surface of the driving wheel 2 is disengaged from the convex first motion receiving surface 17a. The extent of pivotal movement of the supporting lever 5 is limited by the stop 33, and this causes the holder 15 to assume a position in which it cannot be rotated by the driving wheel 2. The bias of the spring 20 upon the holder 15 is then so weak that it cannot overcome the friction between the pivot member 16 and the surrounding internal surface of the holder 15. The projection 22 is closely adjacent to the inclined portion 49 of the entraining lever 45 and the tip of the hook 30 bears against the outer side of the outermost convolution of the film supply 57 so as to enter the oncoming perforation 157a while the supply 57 rotates in the direction indicated by the arrow 58, i.e., in a direction to insure that the supply reel collects the film. In the third position of the intercepting device 15, 24, 30, the projection 28 is spaced apart from the abutment 29 of the holder 15 so that the torsion spring 25 is free to bias the hook 30 against the outermost convolution of the supply 57.

When the hook 30 penetrates into the oncoming perforation 157a to thus catch the leader of the film 157, the catcher arm 24 pivots on the pin 23 in the clockwise direction due to tension of the film 157 whereby the catcher arm 24 causes the holder 15 to turn further in a counterclockwise direction and to move its concave second motion receiving surface 17b into engagement with the peripheral surface of the continuously rotating driving wheel 2. Such movement of the motion receiving surface 17b against the driving wheel 2 is due to the fact that the inclined portion 49 of the entraining lever 45 moves against the projection 22. This causes the shoulder 48 of the entraining lever 45 to become disengaged from the projection 35 of the lever 9. The lever 9 is immediately pivoted by the spring 42 to turn in a counterclockwise direction and reassumes its starting position to thereby pivot the holder 15 by way of the projection 36, pin 34 and supporting lever 5. This causes the holder 15 to turn on the pin 16 so that the concave motion receiving surface 17b engages the driving wheel 2 which then causes the holder 15 to turn in a clockwise direction and to leave the fourth position shown in FIG. 2. The effect of the torsion spring 38 is completely neutralized.

During return movement toward the first position close to the second position of FIG. 1, the hook 30 of the catcher arm 24 begins to draw the leader of film 157 off the reel for the convoluted supply 57. The fact that the supply 57 of convoluted film 157 tends to rotate in the direction indicated by arrow 58 (i.e., counter to the direction in which the supply 57 must rotate in order to pay out the film 157) is of no consequence because the drive means for the supply reel comprises a friction coupling 257 which is designed to transmit a very small torque. The coupling 257 forms part of a drive which connects the motor 102 with the supply reel for convoluted film 157. This drive is started, for example, by the holder 15, not later than when the intercepting device reaches its third position.

Shortly before the holder 15 reassumes its first position (close to the second position shown in FIG. 1), the driving wheel 2 reenters the enlarged end portion 18 of the cutout 17 so that the operative connection between the driving wheel 2 and the holder 15 is terminated. The spring 20 is then capable of transmitting a substantial force and moves the holder 15 all the way to its first position in which the wheel 2 is disengaged from the surfaces 17a and 17b. The holder 15 thereby moves its edge face 56 against the lug 55 of the blocking lever 12 so that the latter is disengaged from the slide 14 against the opposition of the spring 53. The slide 14 would be expected to be free to return to the phantom-line position shown in FIG. 1 under the action of a spring, not shown, and to thereby open the starter switch 200 to arrest the motor 102 for the driving wheel 2 and at least one of the advancing rolls 3, 4. It will be noted, however, that the slide 14 can reassume the phantom-line first position of FIG. 1 only when the user has turned the knob 8 so as to move the actuating member 7 away from the path of movement of bracket 50 on the intermediate lever 10. Such angular movement of the knob 8 is effected only when the user knows or assumes that the advancing rolls 3, 4 have completed the transport of the leader of motion picture film 157 all the way to the takeup reel and that the leader is attached to the core of the takeup reel in a manner well known from the art. In other words, the blocking lever 12 is normally moved out of the path of the slide 14 prior to the intermediate lever 10 so that the motor 102 continues to drive at least one of the advancing rolls 3, 4 until after the leader of the film 157 has reached the core of the takeup reel, or at least until the leader has advanced into the range of the customary claw pull-down which thereupon completes the movement of leader to the core of the takeup reel.

If the user accidentally starts a film threading operation when the supply reel is removed or when the supply reel does not contain a supply 57 of convoluted motion picture film 157, the catcher arm 24 simply remains in the intercepting (third) position until the user notes the mistake and turns the knob 8 so as to disengage the actuating device 7 from the bracket 50 of the intermediate lever 10 which then moves out of the path of the slide 14. The switch 200 thereupon remains closed and the motor 102 continues to rotate the driving wheel 2 until the wheel 2 returns into the enlarged portion 18 of the cutout 17 and the edge face 56 of the holder 15 pivots the blocking lever 12 to the solid-line position of FIG. 1 in which the lever 12 allows the slide 14 to reassume the phantom-line first position of FIG. 1 and opens the switch 200.

The separation of the leader of film 157 from the hook 30 of the catcher arm 24 takes place automatically because the hook 30 can introduce the leader into the nip of the advancing rolls 3, 4. Since the rolls 3, 4 tend to advance the leader of film 157 downwardly, as viewed in FIG. 1 or 2, and the friction coupling 257 tends to rotate the supply 57 in the direction indicated by arrow 58, the film portion between the supply 57 and the station accommodating the rolls 3, 4 becomes taut and is automatically disengaged from the hook 30 of the catcher arm 24. As shown in FIG. 1, the projection 28 of the catcher arm 24 cooperates with the abutment 29 of the holder 15 to maintain the hook 30 away from a straight path extending from the periphery of the film supply 57 to the nip of the rolls 3, 4 so that the hook 30 does not interfere with forward transport of film 157 under the action of the advancing rolls 3, 4 after the film 157 becomes detached from the hook 30. The position of the hook 30 in the first position of the catcher arm 24 should be selected in such a way that the hook 30 cannot interfere with the transport of film 157 by means of the advancing rolls 3, 4 even if the supply reel stores a maximum-diameter supply 57 of convoluted motion picture film.

It is further within the purview of the invention to select the length of the cutout 17 in the holder 15 in such a way that the driving wheel 2, rather than the spring 20, can cause the holder 15 to pivot the blocking lever 12 to the illustrated inoperative position in which the slide 14 is free to move to the phantom-line position of FIG. 1. Such modified apparatus can dispense with the spring 20 and post 21.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to the protected by Letters Patent is set forth in the appended claims:

1. Apparatus for intercepting the leader of a supply of convoluted strip-shaped material wherein the leader constitutes the free end portion of the outermost convolution of said supply, comprising driving means; an intercepting device having first and second motion receiving means and being movable seriatim from a first position in which said driving means is disengaged from both said motion receiving means to a second position in which said driving means engages said first motion receiving means to automatically move said device to a leader-intercepting third position, and a fourth position in which said driving means engages said second motion receiving means to automatically return said device to said first position, said intercepting device further comprising a holder, a catcher arm provided on said holder, and a material-engaging portion provided on said catcher arm; supporting means for said holder, said holder being turnable relative to said supporting means about a predetermined axis and said supporting means being movable in a plane disposed substantially at right angles to said axis; actuating means operable to move said intercepting device from said first to said second position whereby said device automatically advances to said third position to intercept said leader; and means for moving said intercepting device from said third to said fourth position with the intercepted leader whereby said device automatically returns to said first position.

2. Apparatus as defined in claim 1, wherein said driving means comprises a rotary member and said motion receiving means are provided on said holder, said holder having a cutout for said rotary member and said cutout being bounded by a convex surface and a concave surface, one of said surfaces constituting said first motion receiving means and being engaged by said rotary member during movement of said intercepting device from said second to said third position and the other of said surfaces constituting said second motion receiving means and being engaged by said driving member during movement of said intercepting device from said fourth toward said first position.

3. Apparatus as defined in claim 2, wherein said cutout includes two enlarged end portions one of which receives said driving means with clearance in said first position and the other of which receives said driving means with clearance in said third position of said intercepting device.

4. Apparatus as defined in claim 1, wherein said catcher arm is pivotable relative to said holder, said holder having abutment means and said intercepting device further comprising biasing means for normally urging said catcher arm against said abutment means and for urging said material-engaging portion against the outermost convolution of said supply in said third position of said intercepting device.

5. Apparatus as defined in claim 4, further comprising driven advancing means located at a station spaced apart from said supply and arranged to engage and advance the leader not later than upon completed movement of said intercepting device to said first position whereby the advancing means tensions the strip-shaped material between said supply and said station, said abutment means being arranged to maintain said material-engaging portion of said catcher arm away from the path of movement of said material toward said station in the first position of said intercepting device.

6. Apparatus as defined in claim 1, further comprising prime mover means for said driving means, means for starting said prime mover means in response to movement of said intercepting device to said position and comprising an input member movable from a first to a second position in response to movement of said intercepting device from said first to said second position, and blocking means for normally holding said input member in said second position, said holder comprising means for disengaging said blocking means from said input member not later than upon completed return movement of said intercepting device to said first position whereby said input member is free to reassume said first position thereof to thereby arrest said prime mover means.

7. Apparatus as defined in claim 1, wherein said supporting means comprises a lever pivotable about a second axis which is parallel to said predetermined axis.

8. Apparatus as defined in claim 7, wherein said driving means comprises a wheel-shaped member rotatable about a third parallel to said second axis, the line connecting said predetermined axis with said second axis being at least substantially normal to the line connecting said second and third axes.

9. Apparatus as defined in claim 7, further comprising stop means for limiting the extent of pivotal movement of said lever about said second axis.

10. Apparatus as defined in claim 7, further comprising a stationary pivot member defining said second axis and resilient means connecting said pivot member with said holder and arranged to bias said intercepting device to said first position.

11. Apparatus as defined in claim 10, wherein the bias of said resilient means upon said holder decreases during movement of said intercepting device from said second to said third position and increases during movement of said intercepting device from said third to said fourth position.

12. Apparatus as defined in claim 11, further comprising a post connected said resilient means to said holder, said post approaching a straight line connecting said predetermined axis with said second axis during movement of said intercepting device to said third position.

13. Apparatus as defined in claim 1, further comprising means for moving said intercepting device from said first to said second position, including an actuating device operable by hand to move from a first position to a second position, an intermediate lever arranged to pivot in response to movement of said actuating device from said first to a second position, and an entraining lever articulately connected with said intermediate lever and arranged to effect the movement of said intercepting device from said first to said second position in response to pivoting of said intermediate lever.

14. Apparatus as defined in claim 13, wherein said entraining lever is pivotable on said intermediate lever and further comprising resilient means for biasing said entraining lever in a predetermined direction.

* * * * *